United States Patent [19]

Swenson et al.

[11] 4,415,970
[45] Nov. 15, 1983

[54] CACHE/DISK SUBSYSTEM WITH LOAD EQUALIZATION

[75] Inventors: Robert E. Swenson, Mendota Heights, Minn.; Lawrence D. Sasscer, Campbell; Benjamin T. George, Sunnyvale, both of Calif.

[73] Assignee: Sperry Corporation, New York, N.Y.

[21] Appl. No.: 208,891

[22] Filed: Nov. 14, 1980

[51] Int. Cl.³ .............................................. G06F 13/00
[52] U.S. Cl. .................................................... 364/200
[58] Field of Search ......................... 364/200 MS File

[56] References Cited

U.S. PATENT DOCUMENTS 3,449,722  6/1969  Tucker ................................ 364/200
3,725,864  4/1973  Clark et al. ......................... 364/200
4,207,609  6/1980  Luiz et al. ........................... 364/200

Primary Examiner—Raulfe B. Zache
Attorney, Agent, or Firm—Griffin, Branigan & Butler

[57] ABSTRACT

In a system wherein processors are connected through channel units to disk devices, two storage control units (SCU's) are provided between the channel units and the disk devices. The SCU's receive commands from the processor and issue seek instructions to the devices to locate the disk space specified by the commands, provided that a copy of the data from the specified disk space is not resident in a cache store. The commands may be queued for a time in a memory which is accessible by both SCU's. Before issuing a seek instruction to a device, an SCU first determines whether it is the only SCU having a path through a channel unit back to the processor which issued the command or whether there is a path from each SCU to the processor. If both SCU's have a path back to the processor, the SCU issues an untagged seek instruction to the device. If not, the SCU issues a tagged seek instruction to the device. When the disk device completes a seek resulting from a tagged instruction, it sends an interrupt to the SCU which issued the seek and that SCU then notifies the processor which issued the command. In response to the notification the processor issues the command a second time and it is then executed under the control of the SCU. When a device completes a seek resulting from an untagged seek instruction it sends an interrupt to both SCU's and either one may respond to it.

6 Claims, 1 Drawing Figure

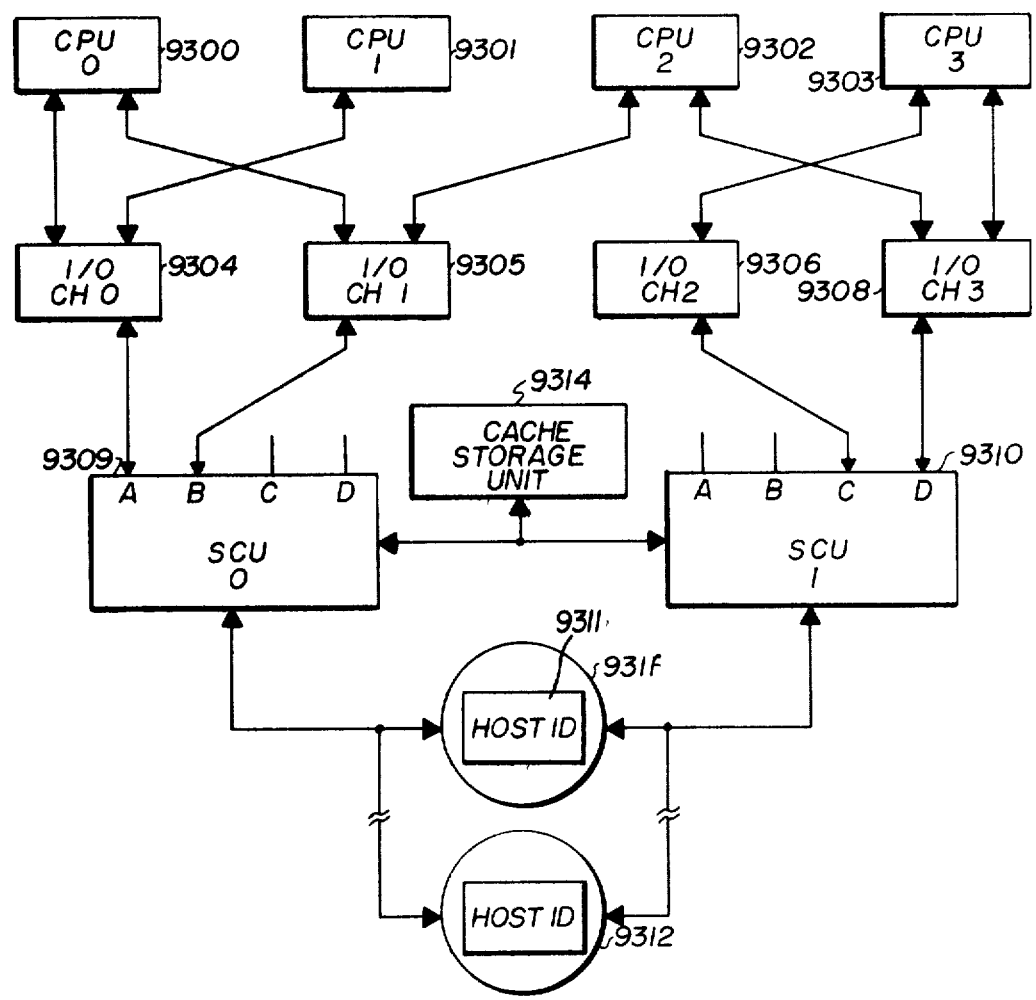

CACHE/DISK SUBSYSTEM WITH LOAD EQUALIZATION

RELATED APPLICATIONS

This application is related to copending Application Ser. Nos. 207,152 and 207,097 filed concurrently herewith and assigned to the same assignee as the present application.

BACKGROUND OF THE INVENTION

The present invention relates to a data processing system of the type having at least one host processor which is connected through plural channel units and plural storage control units to a plurality of disk drive devices and a cache memory.

In copending application Ser. No. 207,152, a host processor desiring to read from, or write to disk space, issues a command which specifies the operation to be performed and the disk space at which the operation is to take place. The storage control unit first checks to see if a copy of the data from the specified disk space is available in the cache store and if it is a data transfer between the hose processor and the cache store is initiated. If a copy of the data is not in the cache store then it must be obtained from a disk device. If the disk device is not busy, the storage control unit issues a seek instruction to the disk device and then proceeds to do other work while the disk device is locating the desired disk space. If the disk device is busy then the storage control unit adds the command to a command queue so that it may be executed later when the disk device is not busy.

In the absence of the present invention, the load on the two storage control units might become highly unequal with one storage control unit having a backlog of work to do while the other storage control unit is idle because it has no work to do. For example, a host processor may issue a request to an idle storage control unit without the necessity of calculating the number of cache misses at that control unit which may be waiting for disk availability. Under these conditions, one storage control unit, following a series of cache misses, may have issued all seeks that are currently outstanding to the disk devices in the subsystem. A number of milliseconds later, when the disk devices have completed their access and are ready to transfer data, only one of them may utilize the storage control unit. Meanwhile the other disk devices must wait even though the other storage control unit may be idle.

The loading of the storage control units could be equalized if the host processor were programmed to calculate the number of cache misses at each storage control unit. However, this would add additional housekeeping tasks to the work load on the host processor.

In accordance with the principles of the present invention the queue of commands waiting to be executed is shared by both storage control units. When either storage control unit is not required to service a disk interrupt a new command from a host processor, it may take a command from the queue and issue a seek instruction to a disk device. The seek is issued untagged if there is a path back to the host processor from either storage control unit but is tagged if the storage control unit issuing the seek is the only one having a path back to the host processor which issued the command.

SUMMARY OF THE INVENTION

An object of the present invention is to provide a cache/disk system for interfacing a plurality of host processors with a plurality of disk drive devices, the host processors generating commands and addressing information, the system including: first and second storage control unit connected to the disk drive devices; means connecting each of the storage control units to at least one of the host processors, the connecting means including means connecting both of the storage control units to at least one of the host processors; means responsive to the storage control units for storing a queue of commands received by the storage control units from the host processor, means for storing a host identification table defining connections between the storage control units and the host processors; accessing means in each storage control unit responsive to a command read from the queue for accessing the host identification table; and, means in each storage control unit responsive to the accessing means and a command read from the queue for issuing a seek start signal to the disk drive device specified by the command read from the queue, the means for issuing a seek start signal including means for issuing a tagged seek start signal if the storage control unit which read the command from the queue is the only control unit connected to the host processor which issued the command; and, the means for issuing a seek start signal including means for issuing an untagged seek start signal if both of the storage control units are connected to the host processor which issued the command which was read from the queue.

An object of the present invention is to provide a cache/disk system as described above wherein the disk drive devices include means responsive to a tagged seek start signal for issuing a seek complete signal to the storage control unit which issued the tagged seek start signal, and means responsive to an untagged seek start signal for issuing a seek complete signal to both of the storage control units.

Another object of the invention is to provide a cache/disk system for interfacing a plurality of host processors with a plurality of disk drive devices, the host processors generating commands and addressing information, including a disk drive device number and a relative word address, the system including: at least two storage control units each storage control unit being connected to the host processors and the disk drive devices; a cache memory unit connected to the storage control units, the cache memory unit including cache storage means, segment descriptor storage means and random access storage means for storing a command queue header and a plurality of command queues, all accessible to each of the storage control units; there being a common queue for each of the disk drive devices with each command queue having a plurality of entries each representing a command waiting to be executed by its associated disk drive device; each storage control unit including, means responsive to certain commands from the host processors for generating and loading an entry into the command queue associated with the disk drive device designated by the device number; means operative during idle periods of the storage control unit for detecting command queues requiring servicing and seek complete signals from disk drives which are ready for data tarnsfers; first means responsive to the detecting means for servicing a command queue requiring service and issuing a seek signal to the associated disk drive device; and second means responsive to the detecting means for formulating device end status and transmitting it to the host processor which issued the command; the host processors including means for reissuing a command upon receipt of said device end status to the storage control unit which transmitted the status; and, means in each storage control unit for accepting a reissued command if it transmitted the device end status to the host processor reissuing it; and, means in each storage control unit, responsive to an accepted reissued command, for controlling the transfer of data from the disk drive device to the host processor reissuing the command whereby any storage control unit may process a seek complete signal even though it did not issue the seek signal.

An object of the present invention is to provide a system as described above wherein each storage control unit includes means responsive to an accepted reissued command for controlling the concurrent transfer of data from the disk drive device to the host processor which reissued the command and the cache storage means.

An object of the present invention is to provide a cache/disk system as described above wherein each storage control units includes means for setting a busy bit in the command queue header when it begins processing a command queue entry, means for checking the busy bit before processing a command queue entry; and means for inhibiting processing of a command queue entry if the busy bit is set.

An object of the present invention is to provide a cache/disk system as described above wherein each storage control unit includes means to force return of the seek complete signal back through the storage control unit.

Other objects of the invention and its mode of operation will become apparent upon consideration of the following description and the accompanying drawings.

BRIEF DESCRIPTION OF THE DRAWING

The single FIGURE comprises a block diagram of a cache/disk system having two storage control units connected in the paths between plural host processors and a plurality of disk drive devices.

DESCRIPTION OF A PREFERRED EMBODIMENT

The drawing illustrates a data processing system comprising four host central processor units (CPU's) 9300-9303, four channel units 9304-9308, two storage control units (SCU's) 9309 and 9310 and a plurality of disk drive devices 9311 and 9312. A cache storage unit 9314 serves both SCU's and includes a cache store portion for storing segments of data and a random access memory (RAM) portion for storing a segment descriptor table (SDT) and global variables. The system illustrated in the drawing is described in copending application Ser. No. 207,152 (Application A) the disclosure of which is incorporated herein by reference, particular reference being made to the section entitled "Cache Seek Start".

Channel unit 9304 is connected to channel interface A of SCU 9309 and may receive information from, or transmit information to, either CPU 9300 or 9301. Channel unit 9305 is connected to channel interface B of SCU 9309 and may receive information from, or transmit information to CPU 9300 or 9302. Channel unit 9306 is connected to interface C of SCU 9310 and may receive information from, or transmit information to, CPU 9303. Channel unit 9308 is connected to interface D of SCU 9310 and may receive information from, or transmit information to either CPU 9302 or 9303.

As disclosed in Application A, when a CPU wishes to initiate a data transfer between itself and a disk space it issues a command through a channel unit to an SCU. The command specifies the operation to be performed (i.e. read or write) and addressing information defining the disk space at which the operation is to be performed. The disk space is specified by a beginning address and the member of words involved in the operation. The SCU receiving the command first utilizes the addressing information to search the SDT to determine whether or not a copy of the data from the specified disk space is resident in the cache store portion of cache storage unit 9314. If it is, then the operation specified by the command is executed using the copy of the data in the cache store.

If a copy of the data from the specified disk space is not resident in the cache store it must be brought from the specified disk space to the cache store. However, the disk device in which the specified disk space is located may be busy. The SCU adds the command to a command queue for the busy disk device and sends Channel End (CE) status with status action 10 (await device end) back to the CPU through the channel unit. This indicates to the CPU that the data from the specified disk space is not resident in the cache store and the SCU most obtain the data from the disk.

There is a command queue for each disk device and the command queues are normally stored in the RAM portion of cache storage unit 9314. The command queues are shared by all SCU's. When either SCU completes a task it enters an Idle Loop (FIG. 67 of Application A) looking for further work to do. If neither a CPU connected to the SCU, nor any disk device requires servicing the SCU checks the command queues (FIG. 84 of Application A) looking for the highest priority disk device which is not busy. Before the SCU executes the command it checks a Host ID table to see if there is a path from the SCU back to the CPU which originally issued the command. The Host ID table is normally stored in the RAM portion of the cache storage unit 9314 and is brought into an SCU for checking. The Host ID table is loaded into the RAM during initialization of the system and identifies which paths exist between the CPU's and the interfaces of the SCU's. When a command is added to a command queue, the entry includes a Host ID which identifies the CPU that issued the command. The SCU determines if it has a path back to the CPU which issued the command by comparing the entries in the Host ID table with the Host ID in the command queue entry.

If an SCU finds that there is an existing path from one of its interfaces to the CPU which originally issued the command, the SCU issues a Seek Start to the disk device and transmits the Host ID to the device where it is stored in a register 9316. The SCU then looks for other work to do while the disk device is locating the disk space specified by the command.

The SCU issues an "untagged" Seek Start to the disk device if there is an existing path from the disk device through both SCU's to the CPU which originally issued the command, or issues a "tagged" Seek Start if there is a path from the device to the CPU through only the SCU issuing the Seek Start. After the disk device has located the disk space specified by the command it issues a Seek Complete to both SCU's if the seek was in response to an untagged Seek Start, or issues a Seek Complete to only that SCU which issued the Seek Start if it was tagged.

Each time an SCU completes any command its program returns to the idle Loop Looking for more work. At this time the SCU may sense that the disk device was completed its seek. The SCU prepares a status word (Device End, Status Action 11). The SCU checks the Host ID table to see if one of its interfaces provides a path back to the CPU which originally issued the command, sets up the interface, and transfer the status word back to the CPU. In response to the status work the CPU reissues the original command. Since the data from the disk space specified in the original command is now available, the SCU initiates the commanded data transfer. For a normal read operation of a dispersed read operation, where a copy of the data is present in the cache store, the data is transferred from the cache store to the CPU through the SCU. If a copy of the data is not present in the cache store then it is read from the disk into the SCU and sent to the CPU. In addition, for a normal read operation a copy of the data read from the disk is entered into the cache store.

The embodiments of the invention in which an exclusive property or privilege is claimed are defined as follows:

1. A cache/disk system for interfacing a plurality of host processors with a plurality of disk drive devices, said host processors generating commands and addressing information, including a disk drive device number and a relative word address, said system including:
   at least two storage control units each said storage control unit being connected to said host processors and said disk drive devices;
   a cache memory unit connected to said storage control units, said cache memory unit including cache storage means, segment descriptor storage means and random access storage means for storing a command queue header and a plurality of command queues, all accessible to each of said storage control units;
   there being a command queue for each of said disk drive devices with each command queue having a plurality of entries each representing a command waiting to be executed by its associated disk drive device;
   each said storage control unit including,
     means responsive to certain commands from said host processors for generating and loading an entry into the command queue associated with the disk drive device designated by said device number;
     means operative during idle periods of the storage control unit for detecting command queues requiring servicing and seek complete signals from disk drives which are ready for data transfers;
     first means responsive to said detecting means for servicing a command queue requiring service and issuing a seek signal to the associated disk drive device; and
     second means responsive to said detecting means for formulating device end status and transmitting it to the host processor which issued the command;
   said host processors including means for reissuing a command upon receipt of said device end status to the storage control unit which transmitted said status; and,
   means in each said storage control unit for accepting a reissued command if it transmitted the device end status to the host processor reissuing it; and,
   means in each said storage control unit, responsive to an accepted reissued command, for controlling the transfer of data from the disk drive device to the host processor reissuing the command,
   whereby any storage control unit may process a seek complete signal even though it did not issue the seek signal.

2. A cache/disk system as claimed in claim 1 wherein each storage control unit includes means responsive to an accepted reissued command for controlling the concurrent transfer of data from the disk drive device to both the host processor which reissued the command and said cache storage means.

3. A cache/disk system as claimed in claim 1 or claim 2 wherein each storage control unit includes means for setting a busy bit in the command queue heater when it begins processing a command queue entry, means for checking said busy bit before processing a command queue entry; and means for inhibiting processing of a command queue entry if said busy bit is set.

4. A cache/disk system as claimed in claim 1 or claim 2 wherein each storage control unit includes means to force return of the seek complete signal back through said storage control unit.

5. A cache/disk system for interfacing a plurality of host processors with a plurality of disk drive devices, said host processors generating commands and addressing information, said system including:
   first and second storage control units connected to said disk drive devices;
   means connecting each of said storage control units to at least one of said host processors, said connecting means including means connecting both of said storage control units to at least one of said host processors;
   means responsive to said storage control units for storing a queue of commands received by said storage control units from said host processors;
   means for storing a host identification table defining connections between said storage control units and said host processors;
   accessing means in each storage control unit for reading a command from said queue and responsive to a command read from said queue for accessing said host identification table; and,
   means in each storage control unit responsive to said accessing means and said command read from said queue for issuing a seek start signal to the disk drive device specified by the command read from said queue;
     said means for issuing a seek start signal including means for issuing a tagged seek start signal if the storage control unit which read said command from said queue is the only control unit connected to the host processor which issued the command; and,
     said means for issuing a seek start signal including means for issuing an untagged seek start signal if both of said storage control units are connected to the host processor which issued the command which was read from said queue.

6. A cache/disk system as claimed in claim 5 wherein said disk drive devices include means responsive to a tagged seek start signal for issuing a seek complete signal to the storage control unit which issued the tagged seek start signal, and means responsive to an untagged seek start signal for issuing a seek complete signal to both of said storage control units.

* * * * *

UNITED STATES PATENT AND TRADEMARK OFFICE
CERTIFICATE OF CORRECTION

PATENT NO. : 4415970

DATED : 11/15/83

INVENTOR(S) : Robert E. Swenson, et al

It is certified that error appears in the above-identified patent and that said Letters Patent are hereby corrected as shown below:

Column 6, Line 18, "heater" should be -- header --.

Signed and Sealed this

Twenty-first Day of February 1984

[SEAL]

Attest:

GERALD J. MOSSINGHOFF

Attesting Officer

Commissioner of Patents and Trademarks